(12) United States Patent
Lee et al.

(10) Patent No.: US 9,741,986 B2
(45) Date of Patent: Aug. 22, 2017

(54) ELECTRODE FOR ELECTROCHEMICAL DEVICE AND ELECTROCHEMICAL DEVICE COMPRISING THE SAME

(71) Applicant: LG Chem, Ltd., Seoul (KR)

(72) Inventors: Joo-Sung Lee, Daejeon (KR); Jong-Hun Kim, Daejeon (KR); Sun-Mi Jin, Daejeon (KR); In-Chul Kim, Daejeon (KR)

(73) Assignee: LG Chem, Ltd. (KR)

(*) Notice: Subject to any disclaimer, the term of this patent is extended or adjusted under 35 U.S.C. 154(b) by 410 days.

(21) Appl. No.: 14/285,849

(22) Filed: May 23, 2014

(65) Prior Publication Data

US 2014/0255751 A1    Sep. 11, 2014

Related U.S. Application Data

(63) Continuation of application No. PCT/KR2012/010791, filed on Dec. 12, 2012.

(30) Foreign Application Priority Data

Dec. 14, 2011   (KR) .................. 10-2011-0134490

(51) Int. Cl.
  *H01M 2/16*   (2006.01)
  *H01M 4/02*   (2006.01)

(52) U.S. Cl.
  CPC ......... *H01M 2/166* (2013.01); *H01M 2/1653* (2013.01); *H01M 2/1673* (2013.01); *H01M 4/02* (2013.01)

(58) Field of Classification Search
  CPC .......................... H01M 2/1653; H01M 2/166
  See application file for complete search history.

(56) References Cited

U.S. PATENT DOCUMENTS

| | | |
|---|---|---|
| 6,387,564 B1 | 5/2002 | Yamashita et al. |
| 2009/0311588 A1 | 12/2009 | Lim et al. |
| 2011/0135987 A1 | 6/2011 | Shin |
| 2011/0293977 A1 | 12/2011 | Kim et al. |
| 2014/0255751 A1 | 9/2014 | Lee et al. |

FOREIGN PATENT DOCUMENTS

| | | |
|---|---|---|
| JP | 06-020707 | 1/1994 |
| JP | 2004-063343 | 2/2004 |
| JP | 2005019241 A | 1/2005 |
| JP | 2006210002 A | 8/2006 |
| JP | 2007258160 A | 10/2007 |
| JP | 2011146219 A | 7/2011 |
| JP | 2014534600 A | 12/2014 |
| KR | 10-2009-0129937 | 12/2009 |
| KR | 10-2010-0071941 | 6/2010 |
| WO | 9838688 A1 | 9/1998 |

OTHER PUBLICATIONS

International Search Report for Application No. PCT/KR2012/010791 dated Apr. 12, 2013.
Supplemental Search Report from European Application No. 12 85 6903, dated Jul. 25, 2015.

*Primary Examiner* — Ladan Mohaddes
(74) *Attorney, Agent, or Firm* — Lerner, David, Littenberg, Krumholz & Mentlik, LLP

(57) ABSTRACT

The present invention provides an electrode for an electrochemical device comprising: an electrode current collector; an electrode active material layer formed on a part of at least one surface of the electrode current collector, and comprising an electrode active material; a packed bed formed on non-coating areas of both sides of the electrode current collector, on which the electrode active material layer is not formed, coated to be continuous with the electrode active material layer, and comprising a mixture of a first inorganic particles and a first polymer binder; and a separation layer formed simultaneously on the surfaces of the electrode active material layer and the packed bed, and comprising a mixture of a second inorganic particles and a second polymer binder.

12 Claims, 3 Drawing Sheets

ELECTRODE FOR ELECTROCHEMICAL DEVICE AND ELECTROCHEMICAL DEVICE COMPRISING THE SAME

CROSS-REFERENCE TO RELATED ED APPLICATION

This application is a continuation of International Application No. PCT/KR2012/010791 filed on Dec. 12, 2012, which claims priority under 35 USC 119(a) to Korean Patent Application No. 10-2011-0134490 filed in the Republic of Korea on Dec. 14, 2011, the disclosures of which are incorporated herein by reference.

TECHNICAL FIELD

The present invention relates to an electrode having a separation layer, which can replace a separator, and an electrochemical device having the same, and more specifically, an electrode having a packed bed for stability of an electrochemical device.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Among currently available secondary batteries, lithium secondary batteries developed in the early 1990's have drawn particular attention due to their advantages of higher operating voltages and much higher energy densities than conventional aqueous electrolyte-based batteries, for example, Ni-MH, Ni—Cd, and H2SO4-Pb batteries. However, such lithium ion batteries suffer from safety problems, such as fire and explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly restrict fire and smoke emission and the like of electrochemical devices. In view of safety characteristics of electrochemical devices, overheating of an electrochemical device may cause thermal runaway or a puncture of a separator may pose an increased risk of explosion. In particular, porous polyolefin membranes commonly used as separators for electrochemical devices undergo severe thermal shrinkage at a temperature of 100° C. or higher in view of their material characteristics and production processes including elongation. This thermal shrinkage may cause a short circuit between an anode and a cathode.

In order to solve the above safety problems of electrochemical devices, an electrode having a porous coating layer formed by combining inorganic particles and binder on the surface of an active material layer of the electrode has been proposed. However, in this electrode, it is difficult to fully coat the porous coating layer on the surface of the active material layer, and there were still safety problems because the side of the electrode was exposed to the outside.

DISCLOSURE

Technical Problem

Accordingly, it is an object of the present invention to provide an electrode for an electrochemical device, which has a porous coating layer having improved stability.

Technical Solution

In order to achieve the object, the present invention provides an electrode for an electrochemical device comprising: an electrode current collector; an electrode active material layer formed on a part of at least one surface of the electrode current collector, and comprising an electrode active material; a packed bed formed on non-coating areas of both sides of the electrode current collector, on which the electrode active material layer is not formed, coated to be continuous with the electrode active material layer, and comprising a mixture of a first inorganic particles and a first polymer binder; and a separation layer formed simultaneously on the surfaces of the electrode active material layer and the packed bed, and comprising a mixture of a second inorganic particles and a second polymer binder.

The electrode current collector may be one manufactured with stainless steel, aluminum, nickel, titanium, sintered carbon, copper; stainless steel surface-treated with carbon, nickel, titanium or silver; an aluminum-cadmium alloy; and the like, but not limited thereto.

The electrode active material may be an anode active material or a cathode active material. The anode active material may be any one active material particle selected from the group consisting of natural graphite, artificial graphite, carbonaceous materials; metals (Me), which is lithium-containing titanium composite oxides (LTO), Si, Sn, Li, Zn, Mg, Cd, Ce, Ni or Fe; alloys consisting of the metals (Me); oxides of the metals (Me) (MeOx); and composites of the metals (Me) and carbon, and the like, but not limited thereto. The cathode active material may be any one active material particle selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-}Co_xM1_yM2_zO_2$ (wherein, M1 and M2 are each independently any one selected from the group consisting of Al, Ni, Co, Fe, Mn, V, Cr, Ti, W, Ta, Mg and Mo, and x, y and z are each independently atomic fractions of oxide-forming elements, where $0 \leq x < 0.5$, $0 \leq y < 0.5$, $0 \leq z < 0.5$, and $x+y+z \leq 1$), and the like, but not limited thereto. The first inorganic particles used in the packed bed of the present invention may be $Al_2O_3$, $BaTiO_3$, $TiO_2$, $CeO_2$, $SiO_2$, $ZrO_2$, $SnO_2$, $CuO$, $ZnO$ and the like, but not limited thereto.

When a polar solvent is used as a solvent for manufacturing the packed bed, the first polymer binder may be any one polymer selected from the group consisting of polyvinyl alcohol, styrene butadiene rubber, polyethylene oxide, carboxyl methyl cellulose, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan and a low molecular compound having molecular weight of 10,000 g/mol or less, or a mixture thereof, but not limited thereto.

And, when an non-polar solvent is used as a solvent for manufacturing the packed bed, the first polymer binder may be any one polymer selected from the group consisting of polyvinylidene fluoride, polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan and a low molecular compound having molecular weight of 10,000 g/mol or less, or a mixture thereof, but not limited thereto.

And, the second inorganic particles used in the separation layer of the present invention may be $Al_2O_3$, $BaTiO_3$, $TiO_2$, $CeO_2$, $SiO_2$, $ZrO_2$, $SnO_2$, $CuO$, $ZnO$ and the like, but not limited thereto.

When a polar solvent is used as a solvent for manufacturing the separation layer, the second polymer binder may be any one polymer selected from the group consisting of polyvinyl alcohol, styrene butadiene rubber, polyethylene oxide, carboxyl methyl cellulose, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan and a low molecular compound having molecular weight of 10,000 g/mol or less, or a mixture thereof, but not limited thereto.

And, when an non-polar solvent is used as a solvent for manufacturing the separation layer, the second polymer binder may be any one polymer selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan and a low molecular compound having molecular weight of 10,000 g/mol or less, or a mixture thereof, but not limited thereto.

Further, the present invention may provide an electrochemical device comprising a cathode, an anode and an electrolyte, wherein the cathode, the anode or both electrodes are the electrode defined above, and the electrochemical device may be a lithium secondary battery.

Advantageous Effects

The electrode for an electrochemical device of the present invention has the packed bed continuous to the electrode active material layer, and thereby the separation layer may be easily fully coated on the surface of the electrode active material layer. Further, the safety of the electrochemical device may be secured because the electrode active material layer is not exposed to the outside even after coating the separation layer.

DESCRIPTION OF DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

<Explanation of Reference Numerals>

| | |
|---|---|
| 100: Electrode | 110: Electrode current collector |
| 120: Electrode active material layer | 130: Packed bed |
| 140: Separation layer | 200: Electrode assembly |
| 210: Electrode current collector | 220: Electrode active material layer |
| 230: Packed bed | 240: Separation layer |
| 260: Electrode current collector | 270: Electrode active material layer |
| 280: Packed bed | 290: Separation layer |
| 300: Electrode assembly | 310: Electrode current collector |
| 320: Electrode active material layer | 330: Packed bed |
| 340: Separation layer | 360: Electrode current collector |
| 370: Electrode active material layer | |

BEST MODE

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
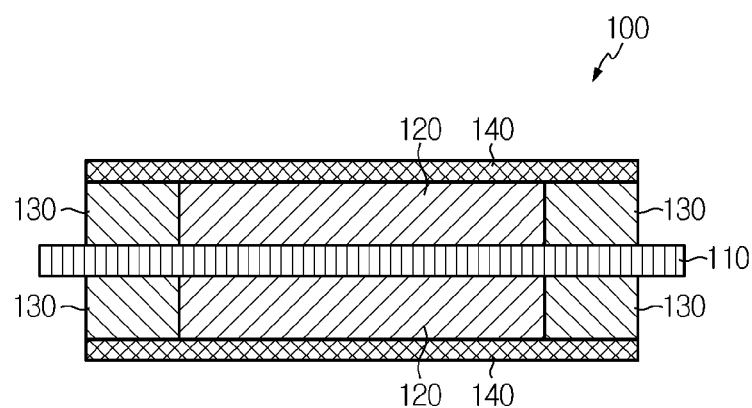
FIG. 1 shows the cross-section of an electrode, in which a separation layer is formed, according to a preferred embodiment of the present invention.

FIG. 1 schematically shows one embodiment of the electrode according to the present invention. However, the embodiments proposed herein are just a preferable example for the purpose of illustrations only, not intended to limit the scope of the disclosure, so it should be understood that other equivalents and modifications could be made thereto without departing from the spirit and scope of the disclosure.

Referring to FIG. 1, the electrode for an electrochemical device 100 of the present invention comprises: an electrode current collector 110; an electrode active material layer 120 formed on a part of at least one surface of the electrode current collector 110, and comprising an electrode active material; a packed bed 130 formed on non-coating areas of both sides of the electrode current collector, on which the electrode active material layer is not formed, coated to be continuous with the electrode active material layer 120, and comprising a mixture of a first inorganic particles and a first polymer binder; and a separation layer 140 formed simultaneously on the surfaces of the electrode active material layer 120 and the packed bed 130, and comprising a mixture of a second inorganic particles and a second polymer binder.

In general, when using common membranes or films as a separator, the thermal stability is deteriorated. Accordingly, the thermal stability can be secured by forming a separation layer containing inorganic particles on the surface of an electrode. However, when forming the separation layer containing inorganic particles on the surface of an electrode active material layer, it is difficult to form the separation layer at the end or edge part of the electrode active material layer. Accordingly, there may be a danger of a short due to exposure of the electrode active material layer at the end or the edge part of the electrode to the outside when forming an electrode assembly.

On the other hand, the electrode of the present invention has a packed bed continuously formed to the both ends or the edges of the electrode active material layer. Accordingly, the separation layer is also formed on the surface of the packed bed, and thereby the exposure of the electrode active material layer to the outside can be prevented. Thus, because the electrode for an electrochemical device of the present invention has the packed bed continuous to the electrode active material layer, the separation layer is easy to be fully coated on the surface of the electrode active material layer. Further, the safety of the electrochemical device can be secured because the electrode active material layer is not exposed to the outside even after coating the separation layer.

The electrode current collector 110 may be one manufactured with stainless steel, aluminum, nickel, titanium, sintered carbon, copper; stainless steel surface-treated with carbon, nickel, titanium or silver; an aluminum-cadmium alloy, and the like, but not limited thereto.

The electrode active material layer is formed on a part of the surface of the electrode current collector, and therefore, there are non-coating areas, on which the electrode active material layer is not formed or not coated, at both ends or edges of the electrode current collector. And, the packed bed is formed to be continuous to the electrode active material layer at the non-coating area. Then, the separation layer is coated simultaneously on the surfaces of the electrode active material layer and the packed bed.

The electrode active material layer of the present invention may be an anode active material layer or a cathode active material layer.

When the electrode active material layer of the present invention is the anode active material layer, it may be manufactured with active material particles consisting of natural graphite, artificial graphite, carbonaceous materials; metals (Me), which is lithium-containing titanium composite oxides (LTO), Si, Sn, Li, Zn, Mg, Cd, Ce, Ni or Fe; alloys consisting of the metals (Me); oxides of the metals (Me) (MeOx); composites of the metals (Me) and carbon; and the like. And, when the electrode active material layer of the present invention is the cathode active material layer, it may be manufactured with an active material particle selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein, M1 and M2 are each independently any one selected from the group consisting of Al, Ni, Co, Fe, Mn, V, Cr, Ti, W, Ta, Mg and Mo, and x, y and z are each independently atomic fractions of oxide-forming elements, where $0 \leq x < 0.5$, $0 \leq y < 0.5$, $0 \leq z < 0.5$, and $x+y+z \leq 1$).

The packed bed of the present invention comprises the first inorganic particles and the first polymer binder.

The first inorganic particle used in the packed bed of the present invention may be one compound selected from the group consisting of $Al_2O_3$, $BaTiO_3$, $TiO_2$, $CeO_2$, $SiO_2$, $ZrO_2$, $SnO_2$, $CuO$ and $ZnO$, or a mixture of two or more of them, but not limited thereto.

And, in the case of the anode, which is used together with an aqueous solvent, it is preferred that a polar solvent is used as a solvent for manufacturing the packed bed. And the first polymer binder may be a polymer selected from the group consisting of polyvinyl alcohol, styrene butadiene rubber, polyethylene oxide, carboxyl methyl cellulose, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan and a low molecular compound having molecular weight of 10,000 g/mol or less, or a mixture thereof, but not limited thereto.

Further, in the case of the cathode, which is used together with a non-aqueous solvent, it is preferred that a non-polar solvent is used as a solvent for manufacturing the packed bed. And the first polymer binder may be a polymer selected from the group consisting of polyvinylidene fluoride, polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan and a low molecular compound having molecular weight of 10,000 g/mol or less, or a mixture thereof, but not limited thereto.

The separation layer of the present invention comprises the second inorganic particles and the second polymer binder.

The second inorganic particles may be one compound selected from the group consisting of $Al_2O_3$, $BaTiO_3$, $TiO_2$, $CeO_2$, $SiO_2$, $ZrO_2$, $SnO_2$, $CuO$ and $ZnO$, or a mixture of two or more of them, but not limited thereto.

And, in the case of the anode, which is used together with an aqueous solvent, it is preferred that a polar solvent is used as a solvent for manufacturing the separation layer. And the second polymer binder may be a polymer selected from the group consisting of polyvinyl alcohol, styrene butadiene rubber, polyethylene oxide, carboxyl methyl cellulose, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan and a low molecular compound having molecular weight of 10,000 g/mol or less, or a mixture thereof, but not limited thereto.

Further, in the case of the cathode, which is used together with a non-aqueous solvent, it is preferred that a non-polar solvent is used as a solvent for manufacturing the separation layer. And the second polymer binder may be a polymer selected from the group consisting of polyvinylidene fluoride-co-hexafluoropropylene, polyvinylidene fluoride-co-trichloroethylene, polymethylmethacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan and a low molecular compound having molecular weight of 10,000 g/mol or less, or a mixture thereof, but not limited thereto.

The present invention provides an electrochemical device comprising a cathode, an anode and an electrolyte, wherein the cathode, the anode or both electrodes are electrodes having a porous coating layer consisting of inorganic particles and a polymer binder which can replace a separator on the surface of the electrodes. The electrochemical device may be any device, in which electrochemical reactions may occur, and specific examples of the electrochemical devices include all types of primary batteries, secondary batteries, fuel cells, solar cells or capacitors.

The electrochemical device may be manufactured using the electrode prepared above. For examples, it may be manufactured by assembling only the electrode prepared above, in which a porous coating layer is formed, through processes such as winding or stacking, and then introducing an electrolyte solution therein, without using a conventional polyolefin-based microporous separator.

The electrolyte, which can be used in the electrochemical device of the present invention, may be one manufactured by dissolving a salt in an organic solvent. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of the organic solvent include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof, but are not limited thereto.

The electrolyte solution may be introduced in any suitable step during the manufacturing of the battery depending on the manufacturing processes and desired physical properties of a final product. Specifically, the electrolyte may be introduced before assembling a battery or in the final step of the assembling.

Figure 2:
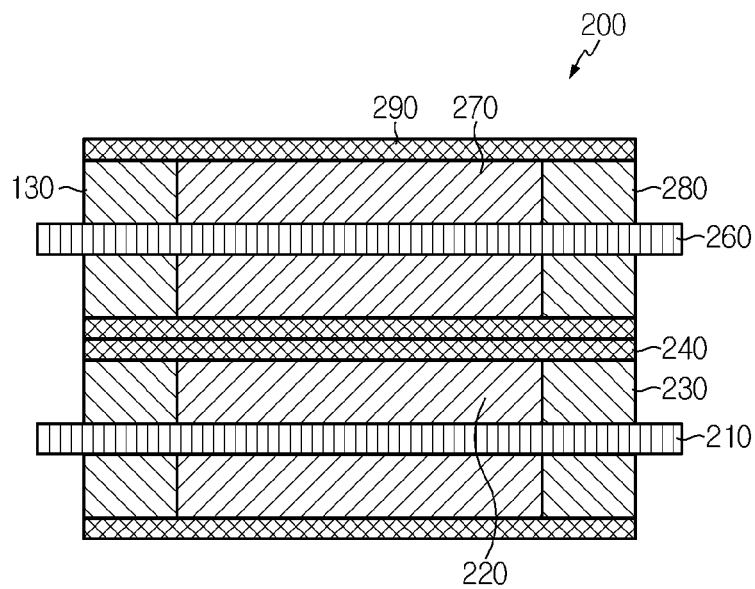
FIG. 2 is the cross-section of an electrode assembly using an electrode having a packed bed and a separation layer according to a preferred embodiment of the present invention.
Figure 3:
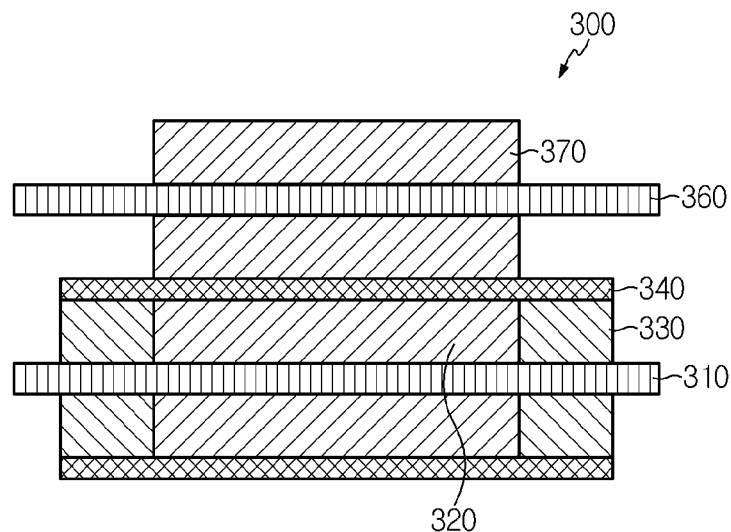
FIG. 3 is the cross-section of an electrode assembly using an electrode having a packed bed and a separation layer according to a preferred embodiment of the present invention.

FIG. 2 and FIG. 3 schematically show the cross-sections of electrode assemblies for an electrochemical device according to a preferred embodiment of the present invention.

Referring to FIG. 2, in the electrode assembly 200 of the present invention, both of the anode and the cathode have packed beds 230, 280 and separation layers 240, 290. On the other hand, referring to FIG. 3, the other electrode assembly 300 may be consisting of an electrode having packed beds 330 and separation layers 340 and electrodes not having thereof 360, 370.

Hereinafter, various preferred examples of the present invention will be described in detail for better understanding. However, the examples of the present invention may be modified in various ways, and they should not be interpreted as limiting the scope of the invention. The examples of the present invention are just for better understanding of the invention to persons having ordinary skill in the art.

EXAMPLE

Example 1

Preparation of Electrode

An aqueous anode active material slurry was manufactured by using graphite as an anode active material. And, as the first polymer binder, styrene butadiene rubber (SBR) and carboxymethyl cellulose (CMC) were mixed at the weight ratio of 2:1 and dissolved in water, and then as the first inorganic particles, titanium dioxide ($TiO_2$) was dispersed to obtain a slurry for a packed bed. Further, as the second inorganic particles, alumina ($Al_2O_3$) and barium titanate ($BaTiO_3$) were mixed at the weight ratio of 8:2, and the resulting mixture was dispersed in an aqueous solution, which was manufactured by mixing styrene butadiene rubber (SBR) and carboxymethyl cellulose (CMC) at the weight ratio of 2:1 as the second polymer binder followed by dissolving in water, to obtain a slurry for a separation layer.

Figure 4:
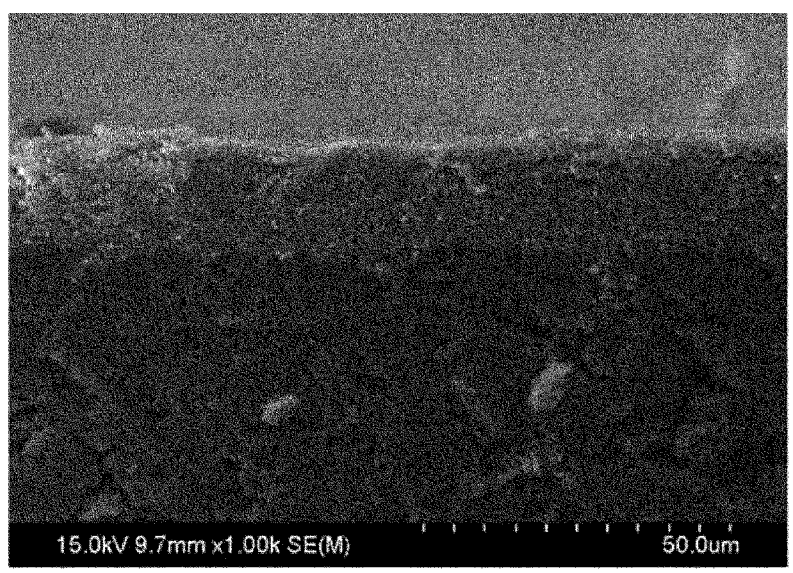
FIG. 4 is an SEM photograph of the cross-section of the anode manufactured according to Example 1 of the present invention.

And, a anode active material was introduced into the center of an electrode current collector made of copper by using an encapsulation die, to form a anode active material layer. The prepared slurry for a packed bed was introduced into both edges of the electrode current collector and then dried to form a packed bed, and thereby a anode is manufactured. An SEM image of the cross-section of the manufactured anode was shown in FIG. 4.

The prepared slurry for a separation layer was coated on the surfaces of the prepared anode active material layer and the prepared packed bed at the same time and then dried to form a separation layer, and thereby an anode was manufactured.

Figure 5:
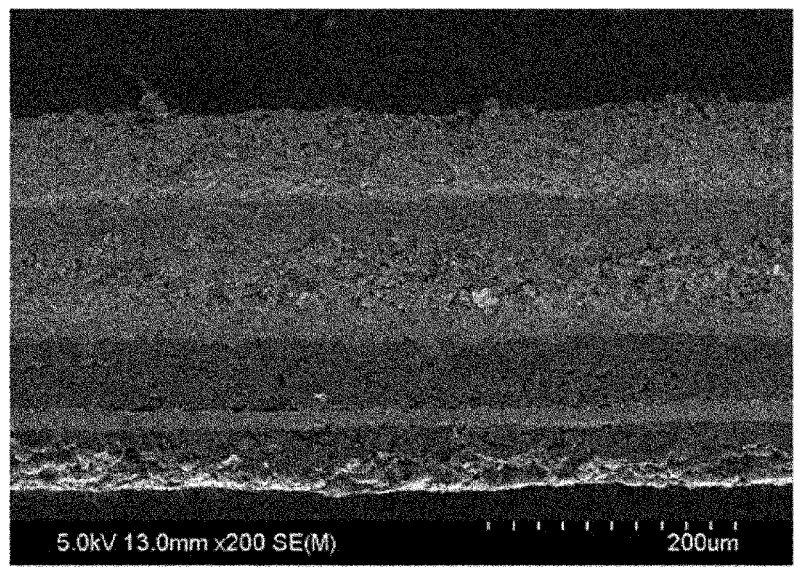
FIG. 5 is an SEM photograph of the bi-cell completed according to Example 1. of the present invention.

A cathode was laminated on the anode having the packed bed and the separation layer manufactured according to the method mentioned above to complete a bi-cell. An SEM image of the cross-section of the completed bi-cell was shown in FIG. 5.

It was confirmed that insulation resistance of the completed bi-cell was 1 MΩ or more, and a role for preventing electrical short is fully performed just by the ceramic packed bed and the separation layer.

Example 2

Preparation of Electrode

A cathode active material slurry was manufactured by dispersing $LiCoO_2$ as a cathode active material in N-methyl pyrrolidone (NMP). And, a slurry for a packed bed was prepared by using a solution, which was manufactured by dissolving alumina ($Al_2O_3$) as the first inorganic particle and polyvinylidene fluoride (PVdF) as a polymer binder in N-methyl pyrrolidone (NMP). Further, a slurry for a separation layer was prepared by using a solution, which was manufactured by mixing alumina ($Al_2O_3$) and barium titanate ($BaTiO_3$) as the second inorganic particle at the weight ratio of 8:2, and polyvinylidene fluoride-hexafluoropropylene (PVdF-HFP) and cyanoethyl polyvinyl alcohol as the second polymer binder at the weight ratio of 9:1 followed by dissolving the mixtures in acetone.

And, a cathode active material was introduced into an electrode current collector made out of aluminum, and dried to form a cathode active material layer. The prepared slurry for a packed bed was coated on non-coating areas existing at both ends or edges of the electrode current collector by an inkjet method and dried, to form a packed bed, and thereby a cathode was manufactured.

The prepared slurry for a separation layer was coated on the surfaces of the prepared cathode active material layer and the prepared packed bed at the same time and then dried to form a separation layer, and thereby a cathode was manufactured.

An anode was laminated on the cathode having the packed bed and the separation layer manufactured according to the method mentioned above to complete a bi-cell.

It was confirmed that insulation resistance of the completed bi-cell was 1 MΩ or more, and a role for preventing electrical short is fully performed just by the packed bed and the separation layer containing inorganic particles.

What is claimed is:

1. An electrode for an electrochemical device comprising:
   an electrode current collector;
   an electrode active material layer comprising an electrode active material, wherein the electrode active material layer is formed on a part of at least one surface of the electrode current collector, and;
   a packed bed comprising a mixture of a first inorganic particles and a first polymer binder, wherein the packed bed is formed on non-coating areas of both sides of the electrode current collector, on which the electrode active material layer is not formed, and the packed bed is coated to be continuous with the electrode active material layer; and
   a separation layer comprising a mixture of a second inorganic particles and a second polymer binder, wherein the separation layer is formed simultaneously on the surfaces of the electrode active material layer and the packed bed, and,
   wherein
   the first inorganic particles comprise any one compound selected from $Al_2O_3$, $BaTiO_3$, $TiO_2$, $CeO_2$, $SiO_2$, $ZrO_2$, $SnO_2$, $CuO$, $ZnO$ or a mixture of two or more thereof, and
   the second inorganic particles comprise two or more compounds selected from $Al_2O_3$, $BaTiO_3$, $TiO_2$, $CeO_2$, $SiO_2$, $ZrO_2$, $SnO_2$, $CuO$ or $ZnO$,
   wherein the first inorganic particles and the second inorganic particles are different by at least one compound,
   wherein height of the packed bed is same with that of the electrode active material layers, and insulation resistance of the separation layer is 1 MΩ or higher.

2. The electrode for an electrochemical device according to claim 1, wherein the electrode current collector is manufactured with stainless steel, aluminum, nickel, titanium, sintered carbon, copper; stainless steel surface-treated with carbon, nickel, titanium or silver; or an aluminum-cadmium alloy.

3. The electrode for an electrochemical device according to claim 1, wherein the electrode active material is any one active material particle selected from natural graphite, artificial graphite, carbonaceous materials; metals (Me), which is lithium-containing titanium composite oxides (LTO), Si, Sn, Li, Zn, Mg, Cd, Ce, Ni or Fe; alloys consisting of the metals (Me); oxides of the metals (Me) (MeOx); composites of the metals (Me) and carbon, or a mixture of two or more thereof.

4. The electrode for an electrochemical device according to claim 1, wherein the electrode active material is any one active material particle selected from $LiCoO_2$, $LiNiO_2$, $LiMn_2O_4$, $LiCoPO_4$, $LiFePO_4$, $LiNiMnCoO_2$ or $LiNi_{1-x-y-z}Co_xM1_yM2_zO_2$ (wherein, M1 and M2 are each independently any one selected from Al, Ni, Co, Fe, Mn, V, Cr, Ti, W, Ta, Mg or Mo, and x, y and z are each independently atomic fractions of oxide-forming elements, where $0 \le x < 0.5$, $0 \le y < 0.5$, $0 \le z < 0.5$, and $x+y+z \le 1$), or a mixture of two or more thereof.

5. The electrode for an electrochemical device according to claim 1, wherein the first polymer binder is any one polymer binder selected from polyvinyl alcohol, styrene butadiene rubber, polyethylene oxide, carboxyl methyl cellulose, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, or a mixture of two or more thereof.

6. The electrode for an electrochemical device according to claim 1, wherein the first polymer binder is any one polymer binder selected from polyvinylidene fluoride, polyvinylidene fluoride-co-hexafluoropropylene, polyvinylidene fluoride-co-trichloroethylene, polymethylmethacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, or a mixture of two or more thereof.

7. The electrode for an electrochemical device according to claim 1, wherein the second polymer binder is any one polymer binder selected from polyvinyl alcohol, styrene butadiene rubber, polyethylene oxide, carboxyl methyl cellulose, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, or a mixture of two or more thereof.

8. The electrode for an electrochemical device according to claim 1, wherein the second polymer binder is any one polymer binder selected from polyvinylidene fluoride-co-hexafluoropropylene, polyvinylidene fluoride-co-trichloroethylene, polymethylmethacrylate, polybutyl acrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, or a mixture of two or more thereof.

9. An electrochemical device comprising a cathode, an anode and an electrolyte, wherein the cathode, the anode or both electrodes are the electrode defined in claim 1.

10. The electrochemical device according to claim 9, which is a lithium secondary battery.

11. An electrode assembly comprising two or more electrodes according to claim 1, wherein the electrodes thereof are insulated by two separator layers interposed between the electrodes, and insulation resistance between the electrodes is 1 MΩ or higher.

12. A method of manufacturing the electrode according to claim 1, comprising:
   preparing a slurry for an electrode active material layer;
   preparing a slurry for a packed bed;
   introducing the slurry for the electrode active material layer in center of an electrode current collector;
   introducing the slurry for the packed bed in both edges of the electrode current collector;
   drying to form the electrode active material layer and the packed bed;
   preparing a slurry for a separation layer;
   coating the slurry for the separation layer on surfaces of the electrode active material layer and the packed bed at the same time; and
   drying to form the separation layer.

* * * * *